United States Patent
Lambare et al.

(10) Patent No.: US 9,348,048 B2
(45) Date of Patent: May 24, 2016

(54) SEISMIC DATA PROCESSING AND APPARATUS

(71) Applicant: CGGVERITAS SERVICES SA, Massy (FR)

(72) Inventors: Gilles Lambare, Saint Fargeau Ponthierry (FR); Jean-Paul Toure, Massy (FR); Ziqin Yu, Massy (FR)

(73) Assignee: CGG SERVICES SA, Massy Cedex (FR)

( * ) Notice: Subject to any disclaimer, the term of this patent is extended or adjusted under 35 U.S.C. 154(b) by 622 days.

(21) Appl. No.: 13/868,422

(22) Filed: Apr. 23, 2013

(65) Prior Publication Data

US 2013/0242699 A1    Sep. 19, 2013

Related U.S. Application Data

(63) Continuation-in-part of application No. 12/156,401, filed on May 30, 2008, now Pat. No. 8,743,656.

(30) Foreign Application Priority Data

May 31, 2007   (FR) ...................................... 07 55377

(51) Int. Cl.
   *G01V 1/00*     (2006.01)
   *G01V 1/30*     (2006.01)
   *G01V 1/28*     (2006.01)

(52) U.S. Cl.
   CPC  *G01V 1/303* (2013.01); *G01V 1/28* (2013.01); *G01V 2210/51* (2013.01); *G01V 2210/512* (2013.01); *G01V 2210/6222* (2013.01)

(58) Field of Classification Search
   None
   See application file for complete search history.

(56) References Cited

U.S. PATENT DOCUMENTS

| 5,808,964 | A | 9/1998 | Lailly et al. |
| 6,002,642 | A | 12/1999 | Krebs |
| 6,577,955 | B2 | 6/2003 | Guillaume |

(Continued)

FOREIGN PATENT DOCUMENTS

| EP | 1239304 | 9/2002 |
| FR | 2821677 A1 | 6/2002 |

(Continued)

OTHER PUBLICATIONS

Guillaume et al, "3D finite offset tomographic inversion of CRP-scan data, with or without anisotropy" SEG Int'l Exposition and Annual Meeting Sep. 9-14.*

(Continued)

*Primary Examiner* — Krystine Breier
(74) *Attorney, Agent, or Firm* — Patent Portfolio Builders PLLC (57) ABSTRACT

There is a method of seismic data processing that includes receiving seismic data that includes a set of seismic traces, each trace including a signal recorded by a sensor after having been propagated in a subsurface area; migrating the seismic data according to a first velocity model; picking from the time-migrated seismic data one or more events corresponding to one or more subsurface reflectors so as to obtain a set of facets locally approximating the event; kinematic demigrating the picked set of facets so as to obtain simplified seismic data that includes the set of facets and a set of attributes associated with the set of facets; migrating the set of facets based on a second velocity model; and updating the initial velocity model based on an alignment of migrated points within the set of facets.

20 Claims, 12 Drawing Sheets

(56) References Cited

U.S. PATENT DOCUMENTS

| | | |
|---|---|---|
| 7,345,951 B2 | 3/2008 | Broto et al. |
| 7,493,241 B2 | 2/2009 | Lee |
| 2006/0062083 A1 | 3/2006 | Lee et al. |
| 2006/0133208 A1 | 6/2006 | Broto et al. |
| 2007/0214663 A1 | 9/2007 | Pica |
| 2007/0271041 A1 | 11/2007 | Peng |
| 2009/0116336 A1 | 5/2009 | Summerfield et al. |
| 2012/0307593 A1 | 12/2012 | Guillaume |

FOREIGN PATENT DOCUMENTS

| | | |
|---|---|---|
| GB | 2280508 | 2/1995 |
| GB | 2301889 | 12/1996 |
| WO | 2008/145742 A1 | 12/2008 |

OTHER PUBLICATIONS

Extended European Search Report in corresponding European Application No. 14 162 550.9-1559 / 2796899 dated Dec. 4, 2014.

H. Chauris, et al., "Migration Velocity Analysis from Locally Coherent Events in 2-D Laterally Heterogeneous Media, Part I: Theoretical Aspects", Geophysics, Jul.-Aug. 2002, pp. 1202-1212, vol. 67, No. 4.

H. Chauris, et al., "Migration Velocity Analysis from Locally Coherent Events in 2-D Laterally Heterogeneous Media, Part II: Applications on Synthetic and Real Data", Geophysics, Jul.-Aug. 2002, pp. 1213-1224, vol. 67, No. 4.

C. H. Dix, "Seismic Velocities from Surface Measurements", Geophysics, Jan. 1955, pp. 68-86, vol. 20, No. 1.

B. Duquet, et al. "3D Plane Wave Migration of Streamer Data", SEG Expanded Abstracts, Sep. 9-14, 2001, SEG Int'l Exposition and Annual Meeting, San Antonio, Texas.

E. Duveneck, "Velocity Model Estimation with Data-Derived Wavefront Attributes", Geophysics, Jan.-Feb. 2004, pp. 265-274, vol. 69, No. 1.

S. Fagin, "Model-Based Depth Imaging", Course Notes Series, No. 10, Society of Exploration Geophysicists, 1999, Tulsa, USA.

P. Guillaume, et al., "Flexible 3D Finite-Offset Tomography Model Building", EAGE 66th Conference and Exhibition, Jun. 10, 2004, pp. 1-4, Paris, France.

P. Guillaume et al., "3D Finite-Offset Tomographic Inversion of CRP-Scan Data, With or Without Anisotropy", SEG Expanded Abstracts, Sep. 9-14, 2001, SEG Int'l Exposition and Annual Meeting, San Antonio, Texas.

R. Jager, et al., "Common-Reflection-Surface Stack: Image and Attributes", Geophysics, Jan.-Feb. 2001, pp. 97-106, vol. 66, No. 1.

J. Jiao, et al., "Residual Migration-Velocity Analysis in the Plane-Wave Domain", Geophysics, Jul.-Aug. 2002, pp. 1258-1269, vol. 67, No. 4.

G. Lambare, et al., "From Time to Depth Imaging: An Accurate Workflow", SEG Expanded Abstracts, 2007, SEG Int'l Exposition and Annual Meeting, San Antonio, Texas.

P. Schultz, "A Method for Direct Estimation of Interval Velocities", Geophysics, Dec. 1982, pp. 1657-1671, vol. 47, No. 12.

R. Siliqi, et al., "Time to Move to Anelliptic Time Processing", SEG Expanded Abstracts, Sep. 9-14, 2001, SEG Int'l Exposition and Annual Meeting, San Antonio, Texas.

Canadian Office Action in corresponding Canadian Application No. 2,688,296 dated Nov. 4, 2014.

* cited by examiner

Time shift of ghost

FIG. 17

SEISMIC DATA PROCESSING AND APPARATUS

CROSS REFERENCE TO RELATED APPLICATIONS

The present application is a continuation-in-part of U.S. patent application Ser. No. 12/156,401 filed on May 30, 2008 which claims the benefit of priority under 35 U.S.C. §119(a) to Patent Application No. 0755377 filed in France on May 31, 2007. The entire contents of each of the above documents are hereby incorporated by reference into the present application.

FIELD OF THE INVENTION

This invention relates to the field of seismic imaging. More specifically, it relates to a method of seismic data processing.

BACKGROUND ART

Figure 1:
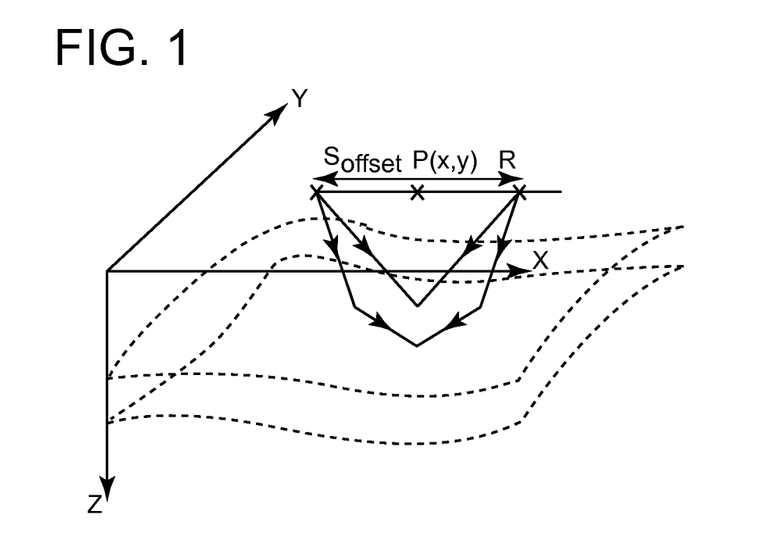
FIG. 1 diagrammatically shows an acoustic source and receiver, as they are used in seismic imaging, FIG. 2 diagrammatically shows a gather of seismic traces at a common mid-point.

In order to produce images of the subsurface, geologists or geophysicists conventionally use acoustic transmitters placed, for example, at the surface. As shown in FIG. 1, the transmitters S (also called sources) transmit waves that are propagated in the subsurface and reflected on the surfaces of the layers thereof (reflectors). The acoustic waves reflected toward the surface are recorded as a function of time by receivers R. The signals recorded by the receivers are called seismic traces.

Various digital processing techniques are conventionally applied to these traces so as to improve the signal-to-noise ratio and facilitate their interpretation. These techniques include the migration operation, which consists of determining, for a plurality of surface positions P of coordinates (x, y), a collection of migrated traces bearing information on events that describe the subsurface in line with the surface position P (x, y). The migration can be applied before or after the stacking of the traces, and we refer to time migration or depth migration depending on whether the output traces are represented according to the time or the depth. In both cases, the repositioning of events is based on a model of the wave propagation velocity in the subsurface, i.e., a time-velocity model for the time migration or a depth-velocity model for the depth migration. The time- or depth-velocity model makes it possible to calculate the travel time between the source and receiver positions and the image point. The estimation of the time- or depth-velocity model is an important and difficult step in the seismic processing chain.

Figure 2:
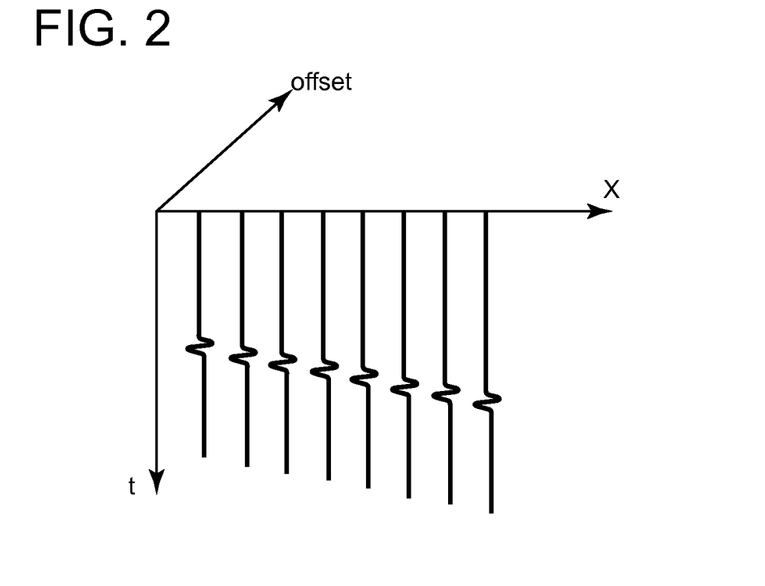

There are numerous ways of arranging the collections of traces migrated before stacking of the data. It is thus possible to group all of the traces in line with a surface position P (x, y) and constitute gathers of traces at a common image point called a CIP (Common Image Point) gather. Generally, these CIP gathers are organized according to the source-receiver distance (also called the offset distance) as shown in FIG. 2, but it is also possible to organize them according to the angles of reflection, the orientation of the source-receiver segment, slopes at the surface, the position of the sources and receivers, etc. The analysis of the migrated images obtained for these different classes is the basis for numerous seismic trace processing techniques. Thus, CIP gathers are very widely used for the interpretation of subterranean geological structures:

1) the stacking of the traces of the CIP gathers at a constant surface position gives a precise image of the structure of the subsurface, 2) the form of the events observed on the CIP gathers makes it possible to assess the quality of the velocity model used in the migration, 3) the amplitude of the events observed on the CIP gathers provides information on the mechanical characteristics of the formations encountered (AVO "Amplitude Versus Offset" studies).

Various techniques have thus been proposed for analyzing these CIP gathers. However, while precise analyses have been carried out in the case of the depth migration, they have not yet been reported in the case of time migration, of which the analysis is often affected by the assumptions of constant time velocity and/or of the absence of dip.

SUMMARY OF THE INVENTION

According to an exemplary embodiment, there is a method of seismic data processing that includes receiving seismic data that includes a set of seismic traces, each trace including a signal recorded by a sensor after having been propagated in a subsurface area; migrating the seismic data according to a first velocity model; picking from the time-migrated seismic data one or more events corresponding to one or more subsurface reflectors so as to obtain a set of facets locally approximating the event; kinematic demigrating the picked set of facets so as to obtain simplified seismic data that includes the set of facets and a set of attributes associated with the set of facets; kinematic migrating the set of facets based on a second velocity model; and updating the initial velocity model based on an alignment of migrated points within the set of facets.

According to another embodiment, there is a computing device for processing seismic data. The computing device includes an interface configured to receive seismic data that includes a set of seismic traces, each trace including a signal recorded by a sensor after having been propagated in a subsurface area; and a processor connected to the interface. The processor is configured to migrate the seismic data according to a first velocity model, pick from the time-migrated seismic data one or more events corresponding to one or more subsurface reflectors so as to obtain a set of facets locally approximating the event, kinematic demigrate the picked set of facets so as to obtain simplified seismic data that includes the set of facets and a set of attributes associated with the set of facets, kinematic migrate the set of facets based on a second velocity model, and update the initial velocity model based on an alignment of migrated points within the set of facets.

BRIEF DESCRIPTION OF THE DRAWINGS

Other features and advantages will become clearer from the following description, which must be read in view of the appended drawings, in which:

FIG. 9 shows a condition for focusing of the kinematic time migration, FIG. 10 diagrammatically shows a vertical stretch determination, FIG. 11 diagrammatically shows a step of determining the cosine of a reflection angle, FIG. 12 diagrammatically shows an instantaneous velocity determination step, FIG. 13 diagrammatically shows step of determining the depth dip on the basis of the time dip and the instantaneous velocity.

DETAILED DESCRIPTION OF THE EMBODIMENTS

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology of seismic attributes.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a method of seismic data processing. The method includes a step of receiving seismic data that includes a set of seismic traces. Each trace includes a signal recorded by a sensor after having propagated in an area of the subsurface, with the signal being defined by amplitude as a function of time. The method also includes a step of migration of the seismic data according to an initial time-velocity model, a step of picking in the time-migrated seismic data one or more events corresponding to one or more reflectors of the subsurface so as to obtain facets locally approximating the event, and a step of kinematic demigration of the facets plotted so as to obtain simplified seismic data in the form of a set of facets and a set of attributes associated with the facets.

The term "facet" refers to a close local representation of an event on a neighboring area of traces, migrated or not, which representation is defined by attributes locally characterizing the event. The attributes is associated with a central position of the event and local slopes of the event in the gather of traces.

In one embodiment of the invention, the kinematic demigration step is performed on the basis of the same initial time-velocity model as the time migration step. This makes it possible to obtain facets characterized by attributes qualified as "kinematic invariants," which are not dependent on the initial velocity model. The invariant attributes include, for example, for each facet after demigration, a time of a reflected event, source and receiver positions, and local slopes of the event reflected in the gather of traces. Thus, the demigrated facets correspond to the local events that can be observed on the gathers of non-migrated traces, and are not dependent upon the velocity model used for the time-migration and time-demigration steps.

The demigration of facets is called "kinematic demigration" because it is applied only to the kinematic characteristics of the reflected field and not to the associated wavelets. In one embodiment, it is possible to take advantage of pre-stack time-migrated data from a previous processing operation.

On the one hand, due to the fact that the processing method is applied to this pre-stack time-migrated data, it does not require a step of building an initial depth model or a step of pre-stack depth migration (pre-SDM). On the other hand, the step of picking data is facilitated by the quality of the pre-stack time-migrated data, without compromising the quality of the kinematic information recovered from the facets.

The kinematic invariants obtained by this process can then be used in a seismic data tomographic inversion process. An iterative process is, for example, described in document EP1239304, which does not require, at each non-linear iteration, picking and pre-stack migration of the initial seismic data.

In an embodiment of the invention, the attributes associated with the facets include, in addition to the attributes representative of kinematic invariants (times, source and receiver positions, slopes in the non-migrated domain), a specular reflection angle, phase angles, an instantaneous velocity, a vertical stretch factor, a depth dip, CRS (Common Reflection Surface) attributes, or a time shift of a ghost. The seismic data processing process shown in FIGS. 3 and 4 includes two processing phases: a first phase 100 of generating the kinematic invariants (FIG. 3) and a second phase 200 of tomographic inversion of these kinematic invariants, i.e., an estimation of the time- or depth-velocity model (FIG. 4), based on the kinematic invariants.

Determination of the Kinematic Invariants

Figure 3:
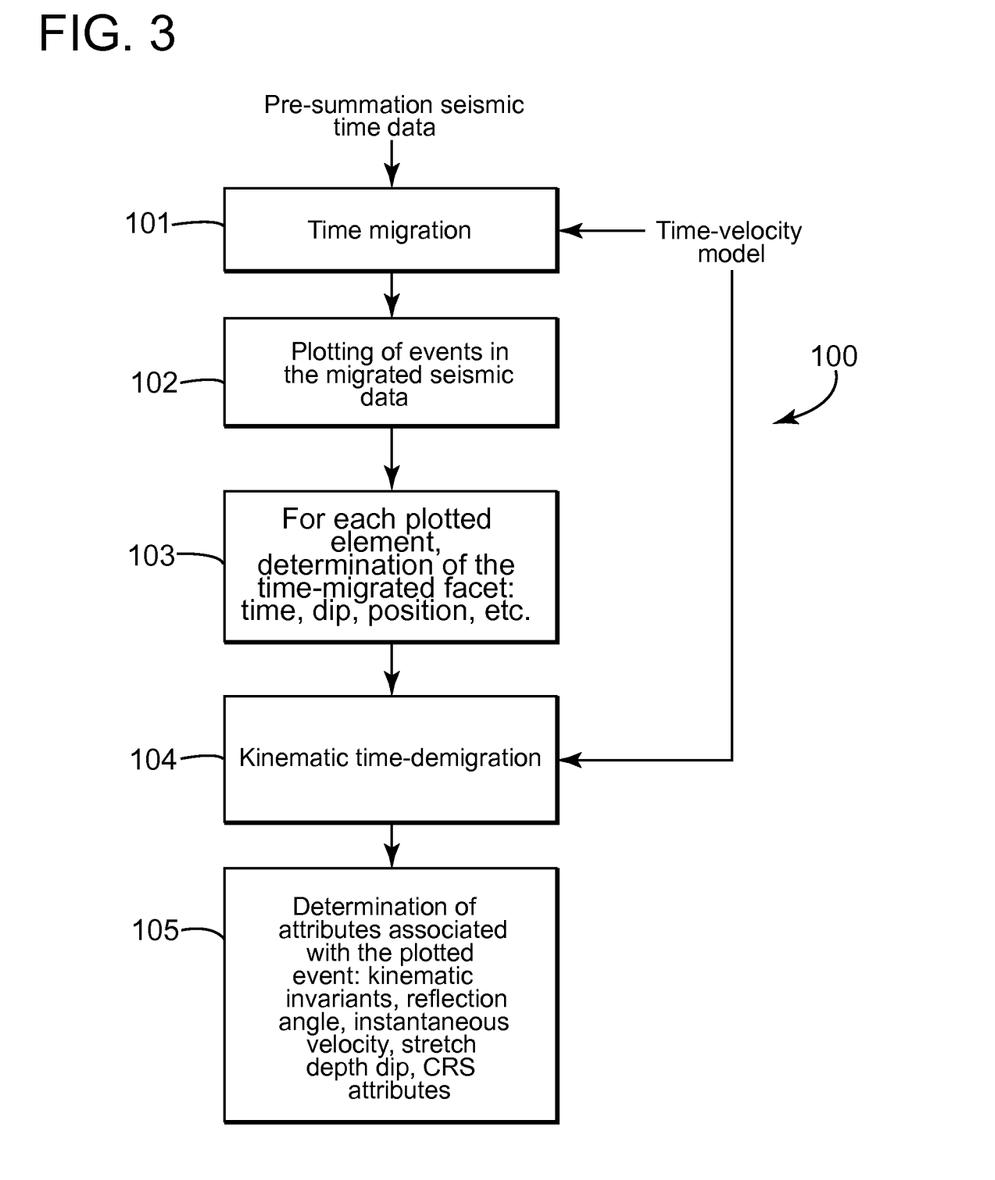
FIG. 3 is a diagram showing steps of a first seismic data processing phase consistent with an embodiment of the invention.

The first phase of the processing algorithm, which is shown in FIG. 3, is applied to time traces before migration. These traces correspond to the recording, as a function of time, by a sensor, of the amplitude of the signal propagated underground (e.g., pressure recorded by a hydrophone).

According to a first step 101, a migration of these seismic traces is performed according to an initial time-velocity model (PreSTM). According to a second step 102, on each gather of traces obtained in the previous step, one or more events reflected in line with the surface point considered are picked.

Figure 5:
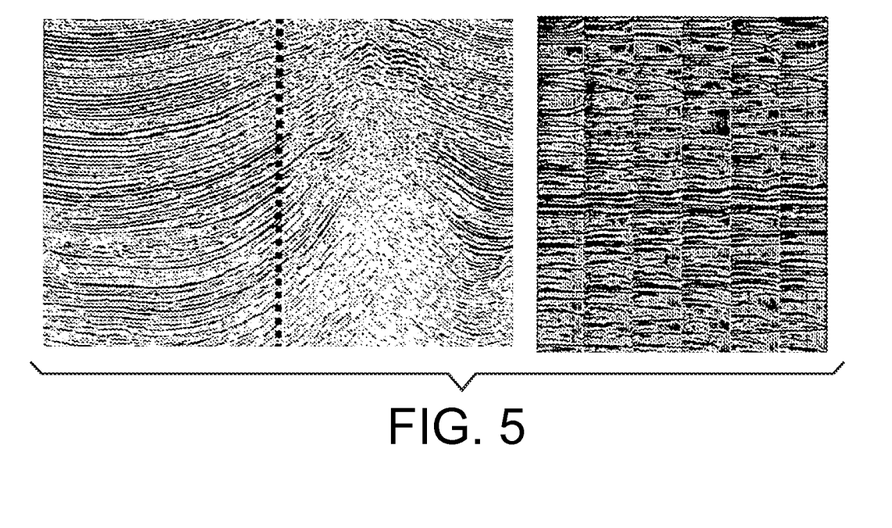
FIG. 5 shows a pre-stack time-migrated seismic data, with at the left-hand side, the stack of the CIP gathers, and, at the right-hand side, some CIP gathers.

FIG. 5 diagrammatically shows a cross-section of the pre-stack time-migrated seismic data (PreSTM) stacked on the CIP gathers (at the left) and common image point (CIP) gathers (at the right) from this data. The position of the CIP gathers is indicated in the cross-section by a dotted line. RMO curves, which characterize the alignment of the data picked in the CIP gathers have been superimposed with the picked data.

According to a third step 103, for each picked event, a time and the associated time-migrated facet are determined. The facet may be characterized by a dip (in directions x, y) and possibly a slope in the direction of the CIP gathers.

According to a fourth step 104, the kinematic demigration of the migrated facet is performed. Kinematic demigration is a process that transforms one facet (i.e., an image) back to the seismic data. This step may be repeated until more than one facet are kinematically demigrated. The facet is characterized by source and receiver positions, by a central time and by slopes, taking into consideration the acquisition geometry and the rules of focusing on the times and the time migration gradients described, for example, in Chauris et al., 2001 a, Migration velocity analysis from locally coherent events in 2-D laterally heterogeneous media, Part I: Theoretical aspects, Geophysics, Vol. 67, No. 4, pages 1202-1212, Chauris et al., 2001b, Migration velocity analysis from locally coherent events in 2-D laterally heterogeneous media, Part II: Applications on synthetic and real data, Geophysics, Vol. 67, No. 4, pages 1213-1224, Guillaume et al., 2004, Flexible 3D finite-offset tomography model building, EAGE 2004, Ext. Abstracts, and Guillaume et al., 2001, 3D Finite-offset tomographic inversion of CRP-scan data, with or without anisotropy, 71.sup.st annual SEG meeting, Exp. Abstracts (see also FIGS. 8 and 9 for the rules of focusing of the kinematic time migration).

The calculation of the acoustic source-receiver pair is a well-known step that can be performed according to a plurality of established techniques. Based on the acoustic source-receiver pair, various attributes associated with the plotted event are also determined in step 105 for each facet, such as the angles of reflection, the phase angles, the instantaneous velocity, the stretch factor, the depth dip, the time shift of the ghost and optionally the CRS attributes. For all of these operations, the basic data are the components of the gradient of the time-migration time.

The demigrated attributes make it possible to characterize local events that can be observed in the seismic traces before migration. As their characteristic does not depend upon the velocity model used for the migration, these data are referred to as kinematic invariants.

These attributes associated with the pre-stack time-migrated image of seismic data make it possible to:

1) provide a depth tomography;

2) provide a new type of time tomography making it possible to determine a time-velocity model with a single update;

3) calculate an instantaneous velocity (isotropic or anisotropic), a stretch factor, a depth dip and aperture angles associated with the pre-stack time-migrated trace gathers. This information can be used, for example, in stratigraphic inversions making it possible to characterize the nature of the subsurface (and in particular hydrocarbon reservoirs), or in various trace processing operations such as wavelet stretch compensation, CIP angle constitution, and amplitude-versus-angle studies;

4) estimate the curves of the local events in the pre-stack seismic data making it possible to reconstruct the CRS attributes, capable of being used in various seismic processing processes.

Calculation of Attributes

With the determination of the acoustic source-receiver pair, it is possible to determine valuable information for the interpretation of time-migrated images. The components of the time migration gradients (FIG. 8) makes it possible to calculate a stretch factor, a specular reflection angle, phase angles, an instantaneous velocity, a depth dip, CRS attributes, and the time shift of the ghost, an attribute for computing the time shift in the migration panel when the depth of the recording surface changes.

Figure 10:
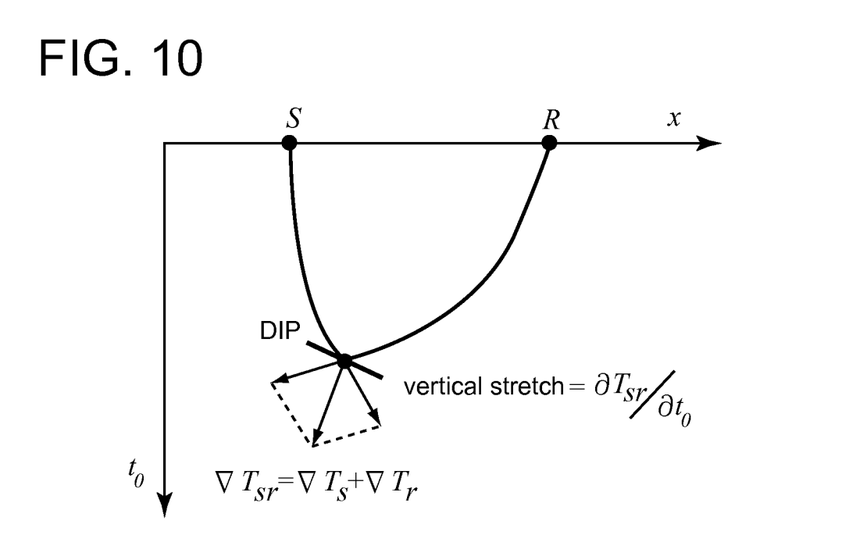

The time migration stretch factor is obtained by considering the "vertical" component of the double time migration gradient (FIG. 10), and it is given by:

$$\text{stretch vertical} = \frac{\partial T_{SR}}{\partial t_0}$$

where $T_{SR}$ is the double time of the time migration operator, and $t_0$ is the time of the time-migrated image. This factor is directly derived from $T_{SR}$, time of the invariant, which may itself be used to compensate for the stretch of the time-migrated trace.

Figure 11:
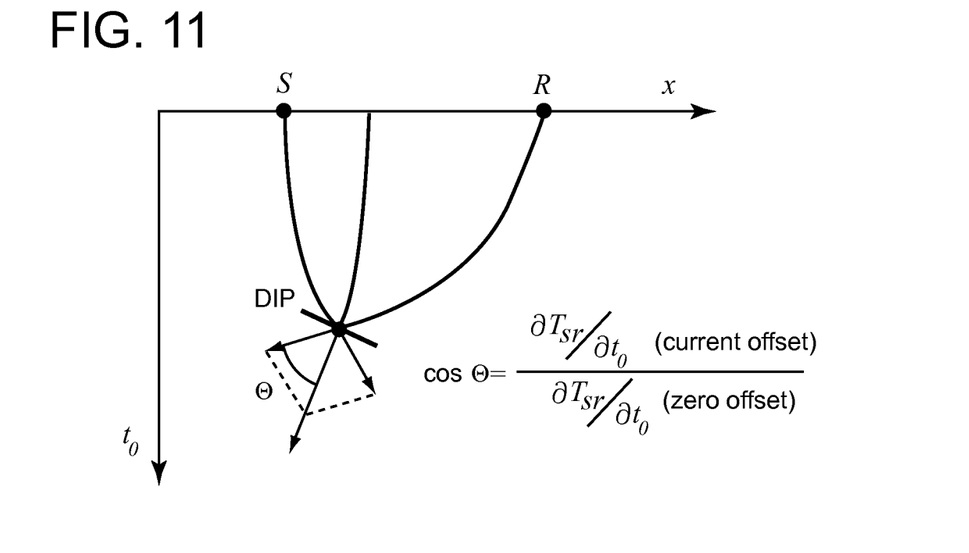

The calculation of the specular reflection angle $\Theta$ associated with the offset-ordered common image point collections is obtained by considering the local dip of the event (assumed to be an offset invariant), and by comparing the values of the "vertical" component of the gradient of the double time of time-migration at various offsets (FIG. 11). Indeed, the ratio of this component of the gradient at a given offset with that with a zero offset gives the cosine of the specular reflection angle. It should be noted that the calculation can also be performed for CIP gathers arranged in shot position or in source or receiver position. Thus, the cosine of the specular reflection angle is given by the ratio of the current offset and the zero offset, i.e., $$\cos\Theta = \frac{\frac{\partial T_{SR}}{\partial t_0}}{\frac{\partial T_{SR}}{\partial t_0}}$$

where $T_{SR}$ is the double time of the time-migration operator, and $t_0$ is the time of the time-migrated image.

Figure 12:
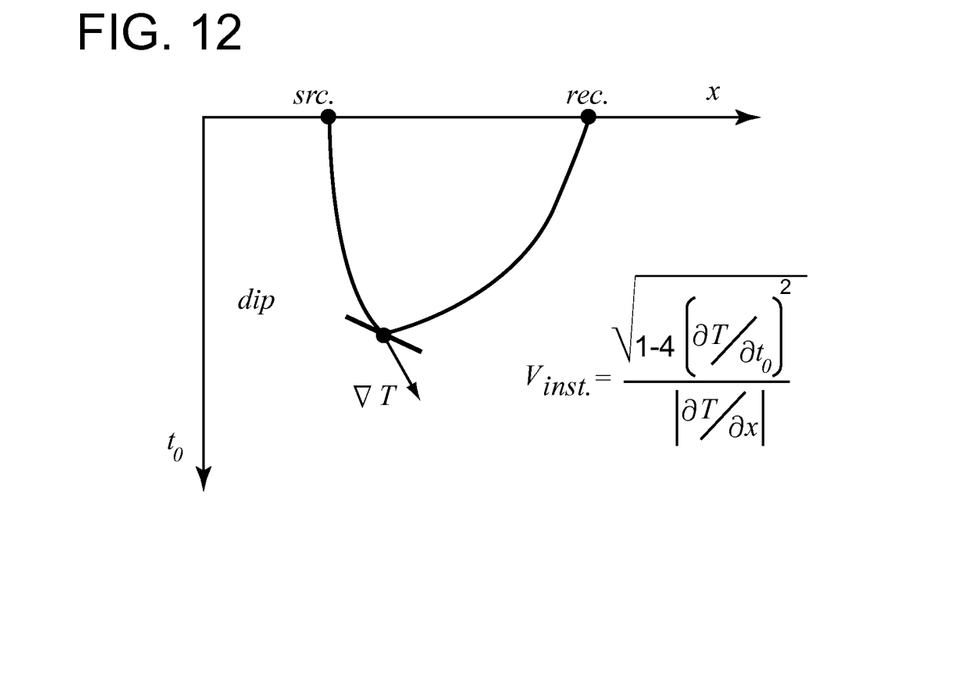

The calculation of an instantaneous velocity $V_{inst}$ on the basis of horizontal and vertical components of the gradient of the one-way travel time of time-migration is obtained by expressing this vector using the angle of incidence of the wave and the instantaneous velocity (FIG. 12). The calculation can be performed for all of the source and receiver geometries, which makes it possible to access anisotropic parameters using the information on the phase angle and the dip estimated below. The instantaneous velocity is given by:

$$v_{inst.} = \frac{\sqrt{1 - \left(\frac{\partial T}{\partial t_0}\right)^2}}{\left|\frac{\partial T}{\partial x}\right|},$$

where T is the one-way travel time of the time-migration operator (for the source or receiver path), x is the horizontal position in the image, and $t_0$ is the time of the time-migrated image.

Figure 13:
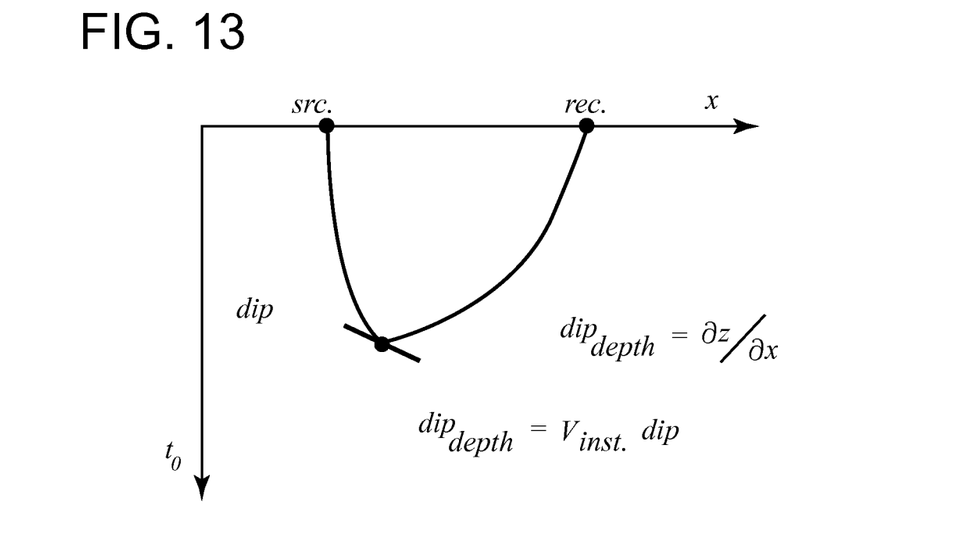

The calculation of the depth dip of the event considered is obtained by considering the picked time dip and the estimation of the instantaneous velocity estimated above (see FIG. 13). Thus, the dip depth is given by:

$$dip_{depth} = \frac{\partial z}{\partial x}$$

$$dip_{depth} = v_{inst} \times dip$$

where z is the depth of the event observed in the depth-migrated, and x is the horizontal position in the image.

Figure 14:
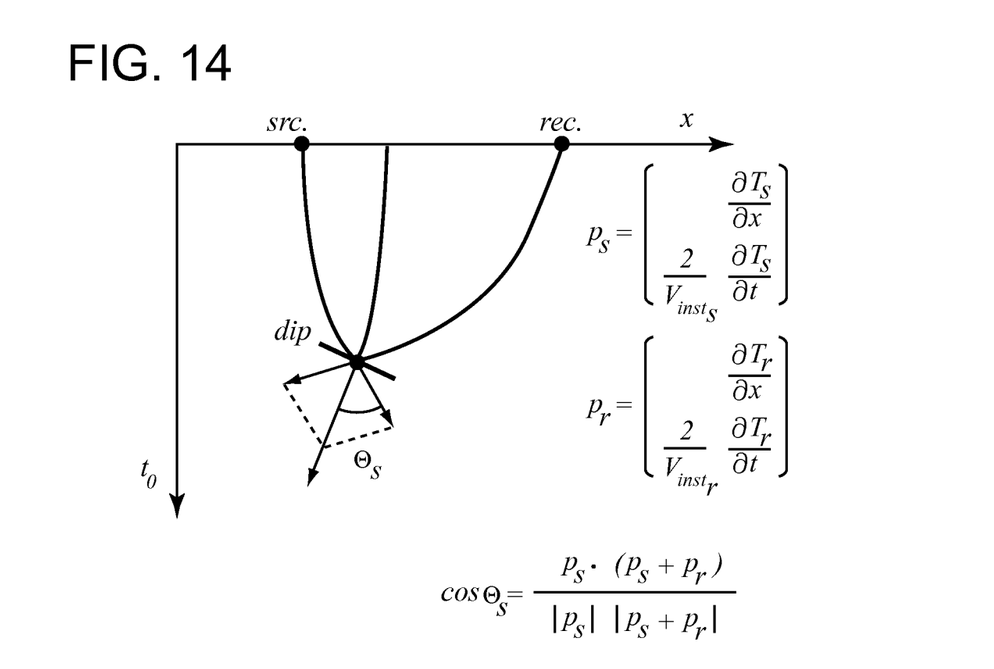
FIG. 14 diagrammatically shows a step of determining phase angles.

The calculation of phase angles makes it possible to free from the assumption of isotropy used for the calculation of reflection angles. It relies on the use of instantaneous velocity which enables slowness vectors $p_S$ and $p_R$ to be calculated at the image point, as follows:

$$p_S = \begin{pmatrix} \frac{\partial T_S}{\partial x} \\ \frac{2}{V_{inst.S}} \frac{\partial T_S}{\partial t_0} \end{pmatrix} \text{ and } p_R = \begin{pmatrix} \frac{\partial T_R}{\partial x} \\ \frac{2}{V_{inst.R}} \frac{\partial T_R}{\partial t_0} \end{pmatrix}$$

where $T_S$ and $T_R$ denote the simple times of the migration operator (for the source and the receiver, respectively). The directions of these vectors are characterized by phase angles. From these vectors, it is also possible to derive the cosine of the phase angle of reflection by equations:

$$\cos\Theta_{S\,phase} = \frac{p_S \cdot (p_S + p_R)}{|p_S||p_S + p_R|} \text{ and } \cos\Theta_{R\,phase} = \frac{p_R \cdot (p_S + p_R)}{|p_R||p_S + p_R|}$$

where ∥ denotes the norm and "·" denotes the scalar product.

The estimation of CRS attributes is obtained by adjustment on the distribution of kinematic invariants obtained by time-demigration of local curve events. These CRS attributes can be used to estimate a depth-velocity model, or for various other applications of the CRS attributes.

Figure 15:
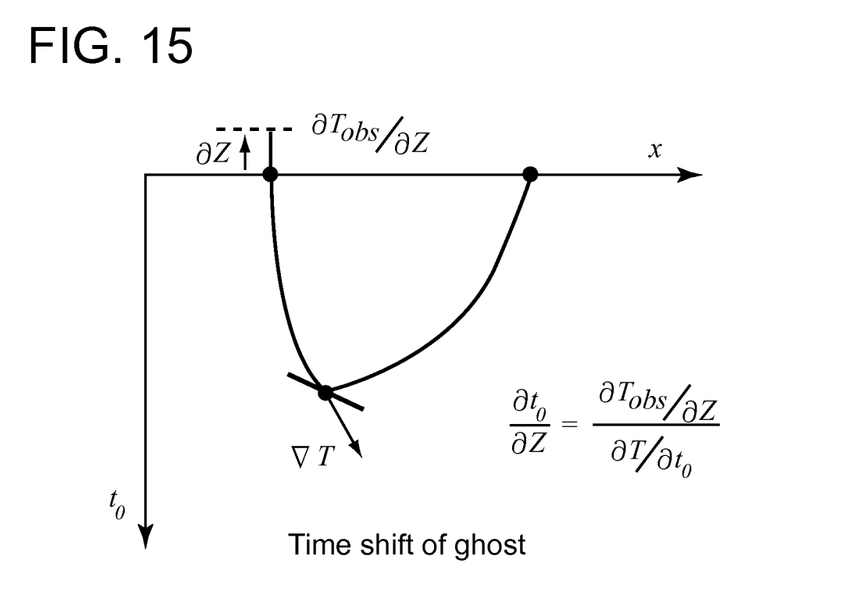
FIG. 15 diagrammatically shows a step of determining a time shift of ghost.

Another attribute that may be introduced is a time shift of the ghost. This attribute can be used for estimating the signal of the ghost, i.e., for computing the time shift in the migration panel when the depth of the recording surface changes (because of sources and/or receivers). This attribute can also be generalized to perform data redatuming after migration. For example, this attribute can be estimated in a similar way as locally coherent events picked on prestack depth migrated seismic data. In one embodiment, the time shift of the ghost can be calculated as follows:

$$\frac{\partial t_0}{\partial Z} = \frac{\frac{\partial T_{obs}}{\partial Z}}{\frac{\partial T}{\partial t_0}},$$

where z is the depth of the event, T is the one-way travel time of the time-migration operator (for the source or receiver path), and $t_0$ is the time of the time-migrated image.

It is noted that while FIGS. 8 to 14 diagrammatically show a two-dimensional case, the process can be generalized, as will be recognized by those skilled in the art, directly to a three-dimensional case.

Figure 8:
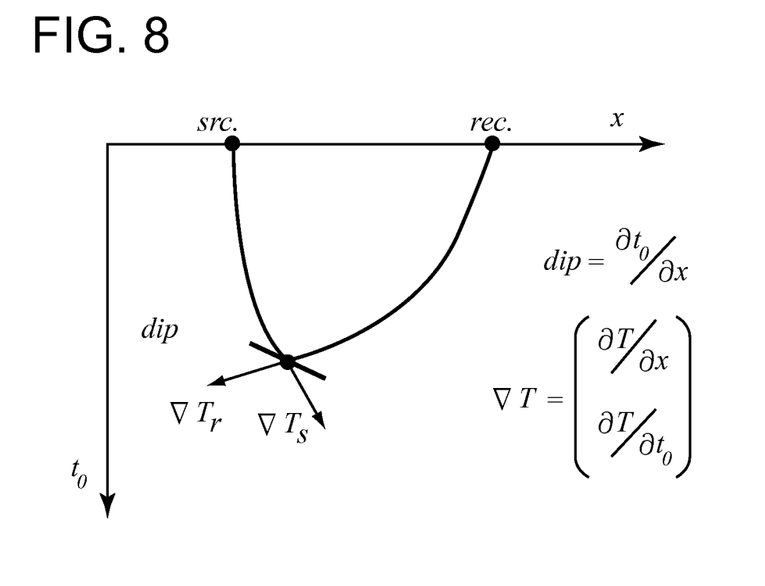

FIG. 8 diagrammatically shows various elements involved in the kinematic migration and demigration steps. These elements include, in particular, the dip of the time-migrated image, and the gradients of the source, $T_S$, and receiver $T_R$ travel times, at the basis of the estimation of various attributes. These travel times are dependent on the position in the migrated image (x, $t_0$), the source S or receiver R position, and finally the velocity model. These elements are used in the time migration, where their sum is involved, $T_{SR}=T_S+T_R$.

Figure 9:
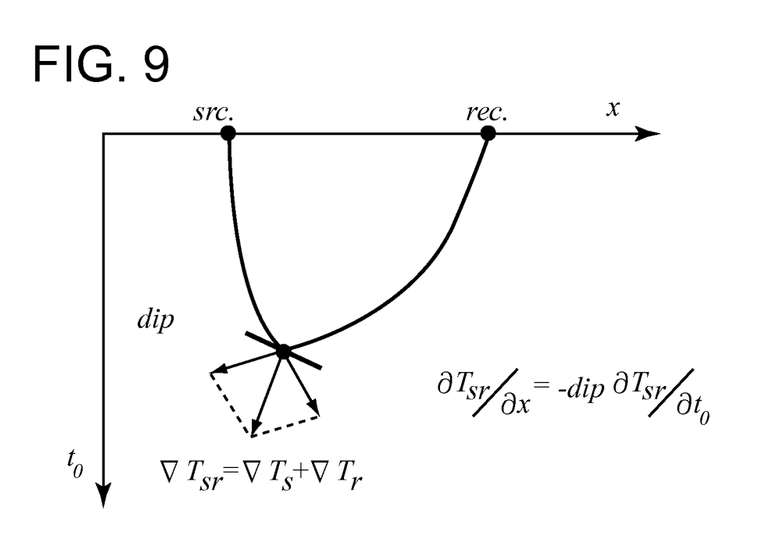

FIG. 9 diagrammatically shows a focusing condition of the kinematic time migration. For a given dip, the position of the migrated point (x, $t_0$) and those of the source and the receiver will satisfy this condition.

FIG. 10 diagrammatically shows a step of determining the vertical stretch.

FIG. 11 diagrammatically shows a step of determining the cosine of the reflection angle. The ratio between the vertical stretch values with a given offset and that with a zero offset is determined. This estimation assumes an isotropic medium.

FIG. 12 diagrammatically shows a step of determining the instantaneous velocity. The components of the single, source or receiver transit time gradients are used. The velocity can therefore be obtained for the source and receiver trajectories.

FIG. 13 diagrammatically shows a step of determining the depth dip on the basis of the time dip and the instantaneous velocity.

FIG. 14 diagrammatically shows a step of determining phase angles. Slowness vectors are calculated from instantaneous velocities and are used to derive phase angles, in particular reflection phase angles.

FIG. 15 diagrammatically shows a step of determining the time shift of the ghost.

Use of the Attributes to Estimate a Velocity Model

Figure 4:
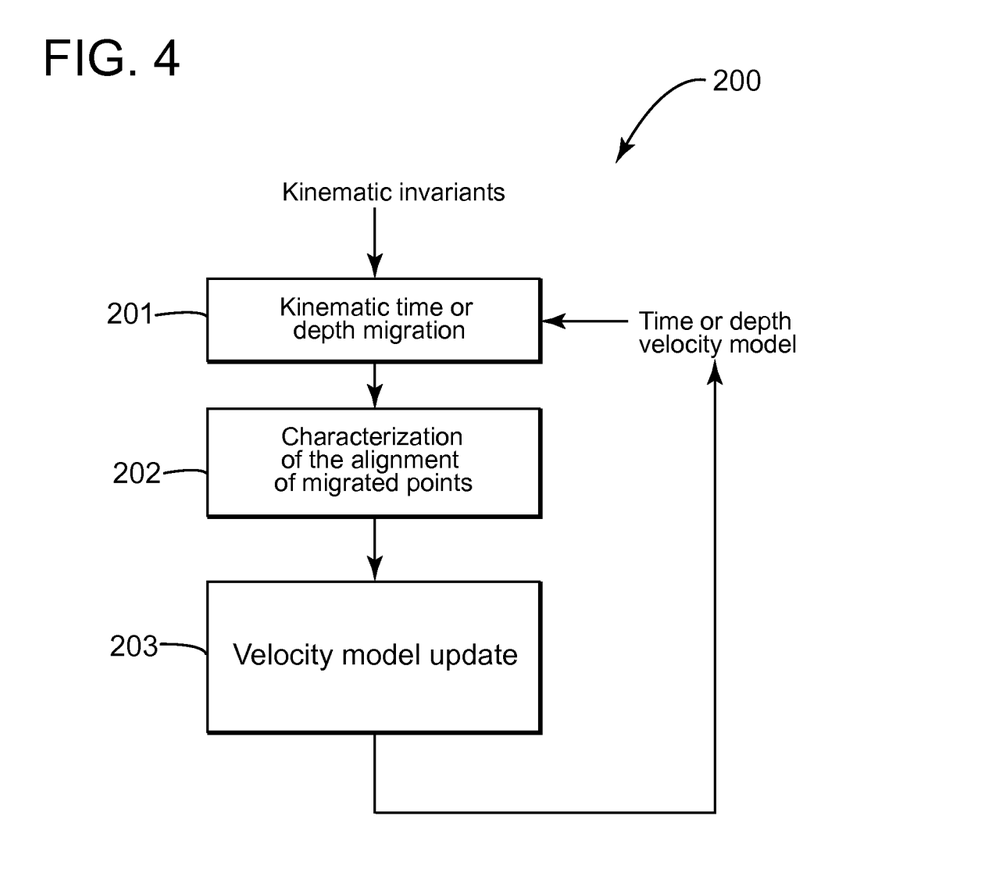
FIG. 4 is a diagram showing steps of a second seismic data processing phase consistent with an embodiment of the invention.

The second phase 200 of the processing process shown in FIG. 4 is applied to the kinematic invariants discussed above.

Based on the kinematic invariants, a processing operation is implemented, making it possible to estimate a time-velocity or a depth-velocity model according to which the following steps are iterated.

According to first step 201, a kinematic migration (time or depth) of the kinematic invariants obtained above is performed using a model of the velocity field (time or depth) of the subsurface.

According to a second step 202, an alignment of the obtained migrated points is characterized. The migrated points may be, for example, center of the facets. If the migrated points are the center of the facets, the alignment compares their positions, and/or the local dips, and/or slopes or other parameters. French Patent FR 2 821 677 describes such alignment measurements. It is also possible to apply a criterion for minimizing the slope of the migrated events in the CIP gathers (Chauris et al., 2001a).

According to a third step 203, the parameters of the velocity model (time or depth) are updated. Step 203 includes a step of selecting a time- or depth-velocity field setting of parameters that optimizes the alignment of the migrated facets. In other words, new settings for the parameters are determined so that the alignment of the migrated points is improved. These parameters are then used to update the velocity model.

Steps 201, 202 and 203 can be repeated until an alignment deemed to be sufficient is obtained.

It should be noted that the processing operation for selecting the parameter values of the velocity field as proposed does not systematically require a time or depth migration of the seismic data (which is very costly) after each updating of the velocity model.

It is consequently understood that the process proposed by this embodiment can be implemented without requiring high computing powers.

Figure 6:
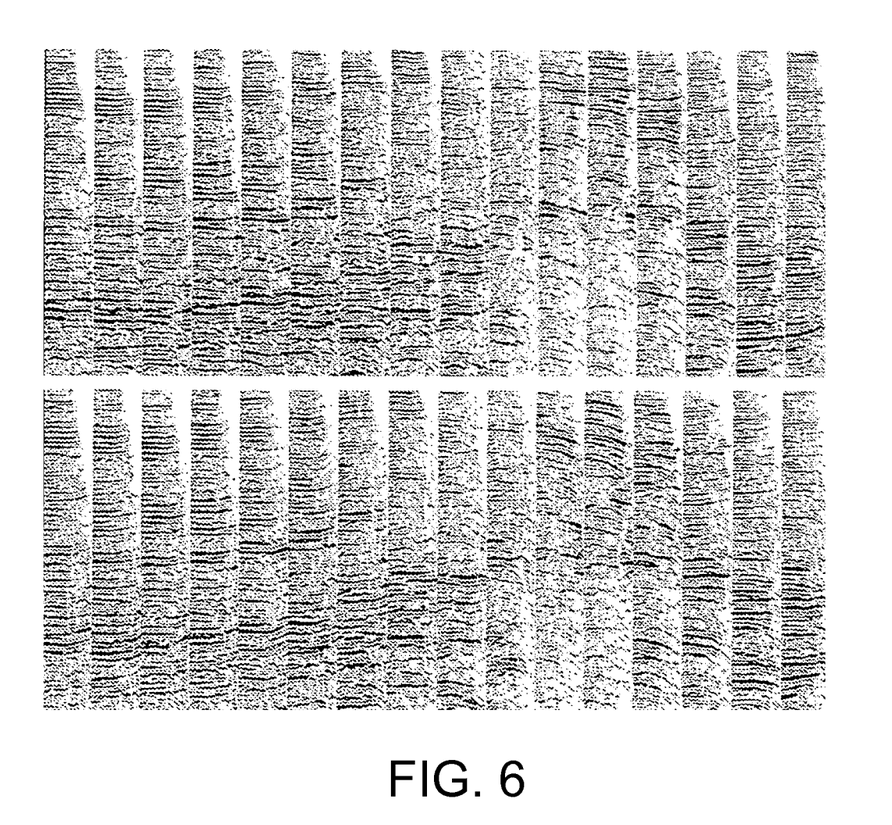
FIG. 6 shows common image point (CIP) gathers of traces.

FIG. 6 diagrammatically shows an example of pre-stack depth-migrated CIP gathers (PreSDM) obtained by respectively applying the final velocity model obtained using a picking in the pre-stack time-migrated data (above) and the final velocity model obtained by using a picking in the pre-stack depth-migrated data (below).

Figure 7:
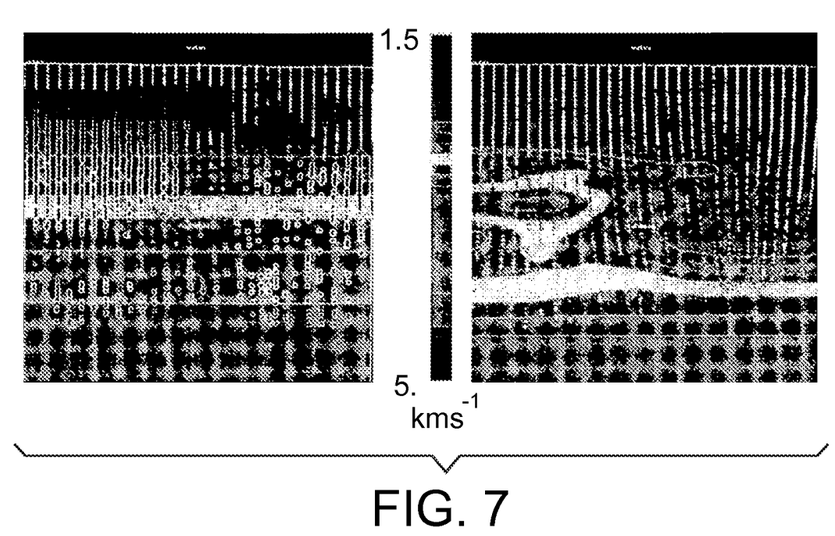
FIG. 7 shows an example of an initial depth-velocity model (at the left) and a final depth-velocity model (at the right) obtained after applying the processing process according to the invention, FIG. 8 diagrammatically shows various elements involved in the kinematic migration-demigration.

FIG. 7 diagrammatically shows an initial depth-velocity model (at left) and a final depth-velocity model (at right) obtained in the second phase of the process.

Figure 16:
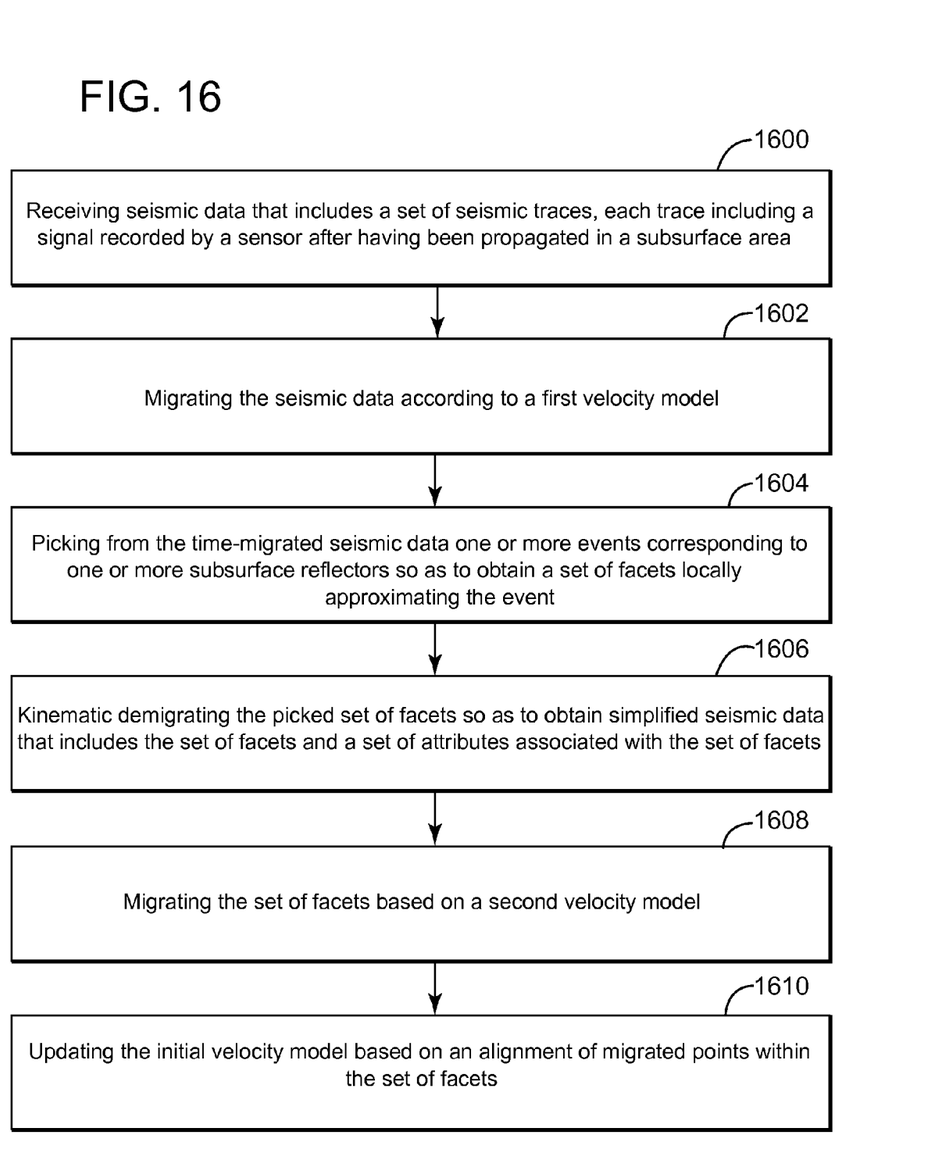
FIG. 16 if a flowchart illustrating a method for determining a velocity model.

According to an embodiment illustrated in FIG. 16, there is a method of seismic data processing that includes a step 1600 of receiving seismic data that includes a set of seismic traces, each trace including a signal recorded by a sensor after having been propagated in a subsurface area; a step 1602 of migrating the seismic data according to a first velocity model; a step 1604 of picking from the time-migrated seismic data one or more events corresponding to one or more subsurface reflectors so as to obtain a set of facets locally approximating the event; a step 1606 of kinematic demigrating the picked set of facets so as to obtain simplified seismic data that includes the set of facets and a set of attributes associated with the set of facets; a step 1608 of migrating the set of facets based on a second velocity model; and a step 1610 of updating the initial velocity model based on an alignment of migrated points within the set of facets.

Figure 17:
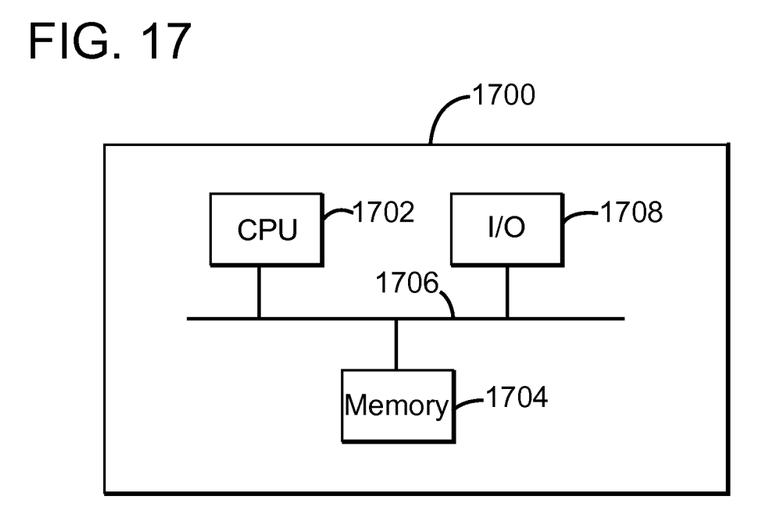
FIG. 17 is a schematic diagram of a computing device.

With regard to the various attributes discussed above, they may be calculated by a computing device which is schematically illustrated in FIG. 17. Also, the methods discussed above may be implemented in this computing device. Such a computing device 1700 includes a processor 1702 and a storage device 1704 that communicate with each other via a bus 1706. An input/output interface 1708 also communicates with the bus 1706 and allows an operator to communicate with the processor or the memory, for example, to input software instructions for calculating one or more of the attributes. Computing device 1700 may be a computer, a server, a processor or dedicated circuitry.

One or more of the embodiments discussed above disclose a system and method for calculating an attribute and using this attribute to determine a time- or depth-velocity model. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method of seismic data processing comprising:
   receiving seismic data that includes a set of seismic traces, each trace including a signal recorded by a sensor after having been propagated in a subsurface area;
   migrating the seismic data according to a first velocity model;
   picking from the time-migrated seismic data one or more events corresponding to one or more subsurface reflectors so as to obtain a set of facets locally approximating the event;
   kinematic demigrating the picked set of facets so as to obtain simplified seismic data that includes the set of facets and a set of attributes associated with the set of facets;
   kinematic migrating the set of facets based on a second velocity model; and
   updating the initial velocity model based on an alignment of migrated points within the set of facets.

2. The method of claim 1, wherein the first and second velocity models are time based or depth based.

3. The method of claim 1, wherein the first velocity model is identical to the second velocity model.

4. The method of claim 1, wherein the set of attributes associated with the set of facets include invariant attributes, independent of the first or second velocity model.

5. The method of claim 4, wherein the invariant attributes include, for each migrated facet, a time of a reflected event, source and receiver positions, and local slopes of the event reflected in the set of traces.

6. The method according to claim 1, further including an iteration of the steps of:
   updating the second velocity model so as to optimize the alignment of the migrated points.

7. The method of claim 6, wherein the updating of the second velocity model includes:
   updating the velocity model according to a criterion of minimization on at least one of the local slopes of the migrated set of facets in common image point (CIP) gathers.

8. The method of claim 1, wherein the set of attributes associated with the set of facets includes at least one of a phase angle or a time shift of a ghost.

9. The method of claim 1, wherein the step of picking is applied to pre-stack time-migrated seismic data.

10. A computing device for processing seismic data comprising:
    an interface configured to receive seismic data that includes a set of seismic traces, each trace including a signal recorded by a sensor after having been propagated in a subsurface area; and
    a processor connected to the interface and configured to,
    migrate the seismic data according to a first velocity model,
    pick from the time-migrated seismic data one or more events corresponding to one or more subsurface reflectors so as to obtain a set of facets locally approximating the event,
    kinematic demigrate the picked set of facets so as to obtain simplified seismic data that includes the set of facets and a set of attributes associated with the set of facets,
    kinematic migrate the set of facets based on a second velocity model, and
    update the initial velocity model based on an alignment of migrated points within the set of facets.

11. The computing device of claim 10, wherein the first and second velocity models are time based or depth based.

12. The computing device of claim 10, wherein the first velocity model is identical to the second velocity model.

13. The computing device of claim 10, wherein the set of attributes associated with the set of facets include invariant attributes, independent of the first or second velocity model.

14. The computing device of claim 13, wherein the invariant attributes include, for each migrated facet, a time of a reflected event, source and receiver positions, and local slopes of the event reflected in the set of traces.

15. The computing device of claim 10, wherein the processor is further configured to iterate the steps of:

updating the second velocity model so as to optimize the alignment of the migrated points.

16. The computing device of claim 15, wherein the processor is configured to:
update the velocity model according to a criterion of minimization on at least one of the local slopes of the migrated set of facets in common image point (CIP) gathers.

17. The computing device of claim 10, wherein the set of attributes associated with the set of facets includes at least one of a phase angle or a time shift of a ghost.

18. The computing device of claim 10, wherein the step of picking is applied to pre-stack time-migrated seismic data.

19. A non-transitory computer readable medium including computer executable instructions, wherein the instructions, when executed by a processor, implement a method for seismic data processing, the instructions comprising:
receiving seismic data that includes a set of seismic traces, each trace including a signal recorded by a sensor after having been propagated in a subsurface area;
migrating the seismic data according to a first velocity model;
picking from the time-migrated seismic data one or more events corresponding to one or more subsurface reflectors so as to obtain a set of facets locally approximating the event;
kinematic demigrating the picked set of facets so as to obtain simplified seismic data that includes the set of facets and a set of attributes associated with the set of facets;
kinematic migrating the set of facets based on a second velocity model; and
updating the initial velocity model based on an alignment of migrated points within the set of facets.

20. The medium of claim 19, wherein the first and second velocity models are time based or depth based.

* * * * *